United States Patent
Dubin et al.

(10) Patent No.: US 6,733,679 B2
(45) Date of Patent: May 11, 2004

(54) METHOD OF TREATING AN ELECTROLESS PLATING WASTE

(75) Inventors: Valery M. Dubin, Portland, OR (US); Chin-Chang Cheng, Hillsboro, OR (US); Christopher D. Thomas, Aloha, OR (US)

(73) Assignee: Intel Corporation, Santa Clara, CA (US)

( * ) Notice: Subject to any disclaimer, the term of this patent is extended or adjusted under 35 U.S.C. 154(b) by 118 days.

(21) Appl. No.: 10/005,737

(22) Filed: Nov. 6, 2001

(65) Prior Publication Data

US 2003/0085177 A1 May 8, 2003

(51) Int. Cl.$^7$ .................................................. C02F 1/58
(52) U.S. Cl. ..................... 210/709; 106/1.22; 106/1.23; 204/DIG. 13; 205/743; 205/755; 205/771; 205/772; 210/718; 210/721; 210/724; 210/737; 210/738; 210/748; 210/750; 210/758; 210/759
(58) Field of Search ................................. 210/709, 714, 210/718, 721, 724, 725, 726, 750, 757, 758, 759, 760, 766, 763, 912, 737, 738, 748; 106/1.13, 1.18, 1.22, 1.23; 204/DIG. 13; 205/743, 744, 755, 771, 772

(56) References Cited

U.S. PATENT DOCUMENTS

| | | | | |
|---|---|---|---|---|
| 3,770,630 A | * | 11/1973 | Kamperman | 75/722 |
| 4,289,594 A | * | 9/1981 | Alpaugh et al. | 588/225 |
| 4,420,401 A | * | 12/1983 | Kretas et al. | 75/740 |
| 4,425,205 A | * | 1/1984 | Honma et al. | 205/702 |
| 4,512,900 A | * | 4/1985 | Macur et al. | 588/225 |
| 4,699,081 A | * | 10/1987 | Mack | 118/691 |
| 4,734,175 A | * | 3/1988 | Bissinger | 205/772 |
| 4,956,097 A | * | 9/1990 | Courduvelis | 210/718 |
| 5,091,070 A | * | 2/1992 | Bauer et al. | 204/530 |
| 5,523,001 A | * | 6/1996 | Foeckler et al. | 210/721 |
| H1852 H | * | 6/2000 | Alexander et al. | 246/349 |
| 6,391,209 B1 | * | 5/2002 | Belongia et al. | 210/748 |

* cited by examiner

Primary Examiner—Peter A. Hruskoci
(74) Attorney, Agent, or Firm—Blakely, Sokoloff, Taylor & Zafman LLP

(57) ABSTRACT

A method of treating an electroless plating waste is provided. The waste is contained and an ability of a reducing agent to reduce a metal of the waste is decreased, for example by adding a stabilizing chemical or by exposing the waste to an anode to which a positive voltage is applied. Poisonous and explosive gases evolve from the waste, which are vented. Upon completion, the waste is drained.

18 Claims, 2 Drawing Sheets

METHOD OF TREATING AN ELECTROLESS PLATING WASTE

BACKGROUND OF THE INVENTION

1). Field of the Invention

This invention relates to a method of treating an electroless plating waste.

2). Discussion of Related Art

Plating techniques are often used to plate a layer of metal on a substrate such as a semiconductor wafer. Electroplating requires that a voltage be applied to a conductive metal layer on the substrate. Electroless plating has the advantage that such a layer often does not have to be formed, and that it does not require the additional apparatus to apply a voltage to any such layer.

Electroless plating solutions, however, include a reducing agent which reduces the metal in the solution so that the metal plates out over the surface of the substrate, typically in the presence of a catalyst. The electroless plating solution is eventually dispersed in a drain as waste. The ability for the reducing agent to reduce the metal is problematic in the electroless plating waste that results from the electroless plating solution. The reducing agent continues to reduce the metal over time, which produces a powder that can block waste drains. It may also be possible that the metal will plate out over surfaces within such waste drains. Hazardous gases such as hydrogen gas can also be generated in the electroless plating waste due to reducing agent oxidation, hydrolysis, etc.

BRIEF DESCRIPTION OF THE DRAWINGS

The invention is described by way of examples, with reference to the accompanying drawings, wherein.

DETAILED DESCRIPTION OF THE INVENTION

Apparatus

Figure 1:
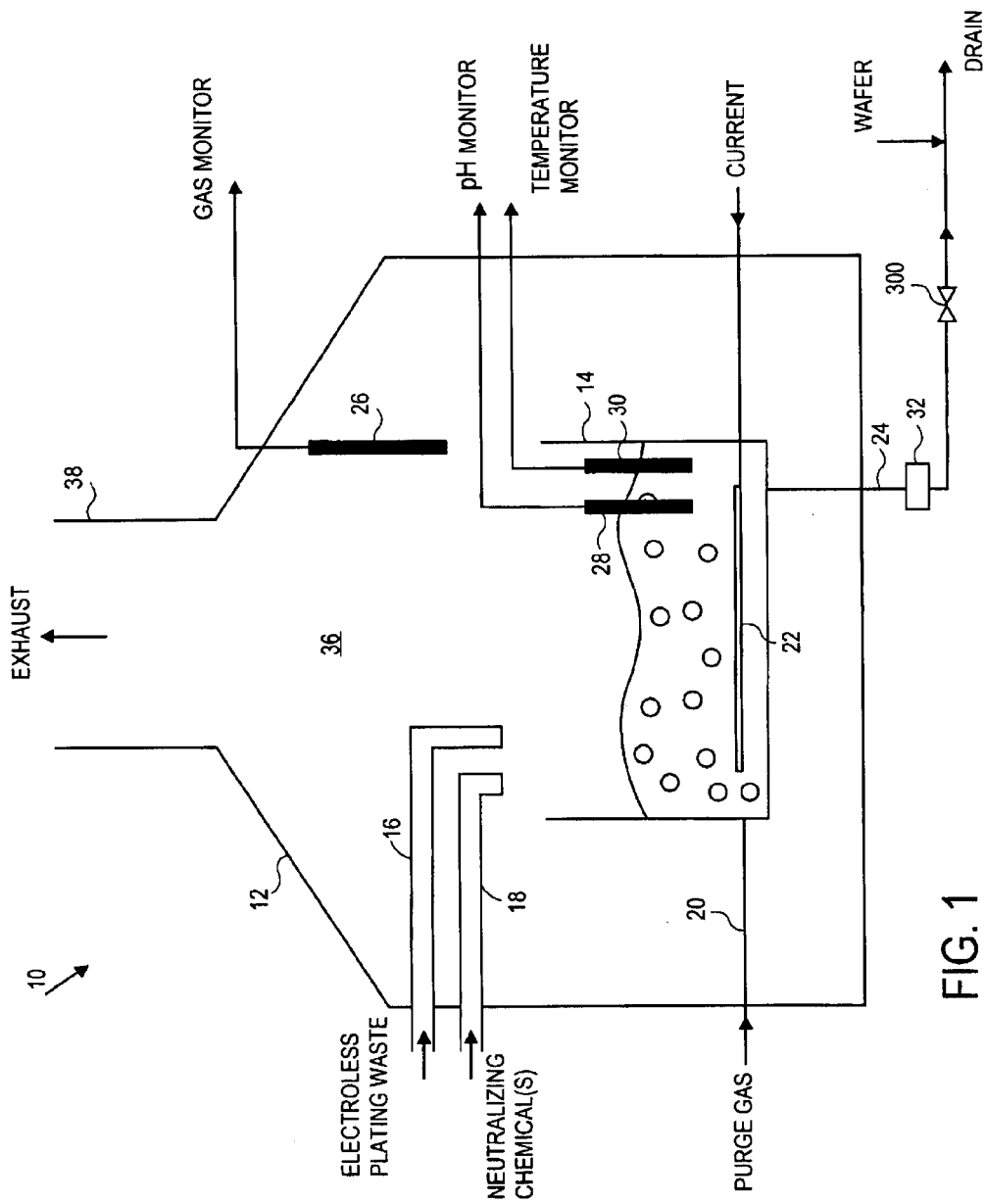
FIG. 1 is a cross-sectional side view of the apparatus which is used for carrying out the method according to the invention.

FIG. 1 of the accompanying drawings illustrates apparatus 10, which is used for carrying out the method according to the invention. The apparatus 10 includes an external container 12, an internal container 14, an electroless plating waste line 16, a stabilizing chemical line 18, a purge gas line 20, a heating element 22, a drain line 24, a gas concentration detector 26, a pH detector 28, a temperature detector 30, and a filter 32.

The internal container 14 is located within the external container 12. The internal container 14 is in the form of a tank, which is open at the top and is capable of holding a liquid. The external container 12 forms an enclosed volume 36 above the internal container 14, and has an exhaust opening 38 at the top.

Both the electroless plating waste line 16 and the stabilizing chemical line 18 extend through a wall of the external container 12, and have ends that are located above the internal container 14. Liquid, or other particulate matter, which flows through the lines 16 and 18 is dispensed through the ends of the lines 16 and 18 into the internal container 14. The electroless plating waste line 16 is connected to an electroless plating tank through a valve. (The line 16 may alternatively be connected through a valve to a waste holding tank.) The stabilizing chemical line 18 is connected through a valve to a tank containing a stabilizing chemical or chemicals. (The stabilizing chemical line 18 may alternatively be connected to a bulk chemical delivery system.)

The purge gas line 20 extends through the wall of the external container 12 into the external container 12, and then through a wall of the internal container 14 into the internal container 14. A purge gas can thus be provided from a source located externally of the external container 12 into the internal container 14.

The heating element 22 is located in a base of the internal container 14. A variable switch is located externally of the external container 12, and the heating element 22 is connected through electric wiring to the switch. The switch can be used to vary a voltage and a current flowing through the heating element 22. An amount of heat created by the heating element 22 can thus be controlled from a location externally of the external container 12.

The drain line 24 is connected to a base of the internal container 14, and extends through a base of the external container 12. The filter 32 is located in the drain line 24. A liquid containing a particulate matter can flow from the internal container 14 through the drain line 24. The particulate matter flowing through the drain line 24 is filtered out by the filter, and the remaining liquid flows to drain under gravity.

The gas concentration detector 26 is located within the enclosed volume 36, and is connected to an external gas monitor. The gas concentration detector 26 is capable of detecting a concentration of one or more gases within the enclosed volume 36, and a visual indication of the concentration of the gas or gases is provided on the external gas monitor.

The pH detector 28 and the temperature detector 30 are located within the internal container 14, and are connected to a pH monitor and a temperature monitor, respectively, located externally off the external container 12. The pH detector 28 and the temperature detector 30 detect the pH and temperature, respectively, of a liquid or other substance in the internal container 14. The pH level can be visually monitored on the external pH monitor, and the temperature level can also be externally monitored on the external temperature monitor.

The addition of chemicals, measurement of pH, temperature, applied voltage from an external source, agitation, and a gas monitor system can be tied into a closed-loop automated system based on measured pH, temperature, gas concentration, or pre-set time, and to automatically discharge the waste based on a suitable pre-set endpoint such as pH, temperature, and gas concentration.

Process Overview

Figure 2:
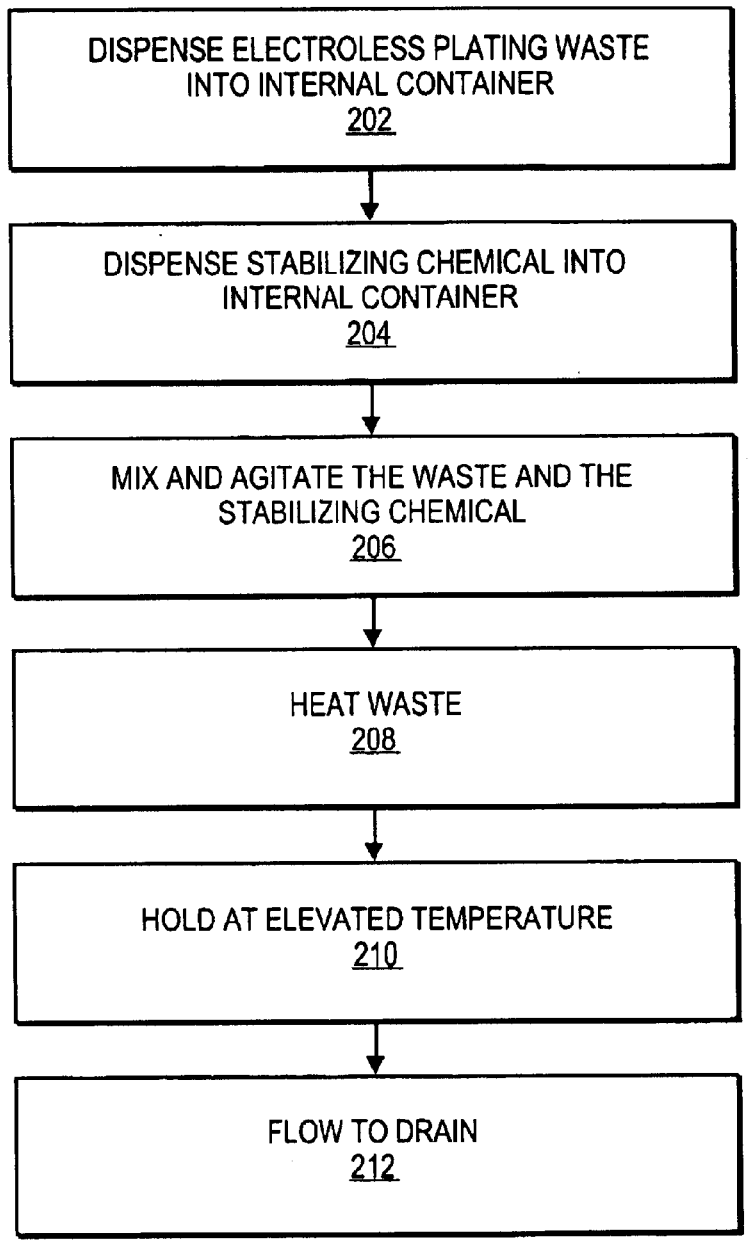
FIG. 2 is a flow chart illustrating the primary steps of the method according to the invention.

FIG. 2 of the accompanying drawings illustrates the basic process flow. FIG. 2 should be read in conjunction with FIG. 1.

The valve connecting the electroless plating waste line 16 to the electroless plating bath is opened. An electroless plating waste flows from the electroless plating bath through the electroless plating waste line 16, and dispenses through its end into the internal container 14 (Step 202). The electroless plating waste may, for example, be a cobalt electroless plating waste, a nickel electroless plating waste which is the same as the cobalt waste, or a copper electroless plating waste. A cobalt electroless plating waste may, for example, include cobalt, citric acid, $NH_4Cl$, tetramethyl ammonium hydroxide (TMAH), with dimethyl amine borane (DMAB) complex as a reducing agent. A copper electroless plating waste may, for example, include copper, ethylene diamine tetraacetic acid (EDTA), TMAH, and either a formaldehyde or glyoxylic acid as a reducing agent.

The valve connecting the stabilizing chemical line 18 to the tank containing the stabilizing chemical is then opened. A preselected amount of the stabilizing chemical then flows through the stabilizing chemical line 18 out of its end, and dispenses into the electroless plating waste in the internal container 14 (Step 204). The stabilizing chemical reduces the ability of the reducing agent to reduce the metal of the particular electroless plating waste. The stabilizing chemical may, for example, be selected to decrease the pH of the electroless plating waste, to change an anodic potential of the reducing agent toward a cathodic potential, to cause the metal to precipitate out of the electroless plating waste, or a combination of any of these processes. It may also be possible to provide a voltage to an anode to which the electroless plating waste in the internal container 14 is exposed, instead of or in addition to adding stabilizing chemicals to the electroless plating waste. The internal container 14 may, for example, be conductive, and a positive voltage may be applied to the internal container 14.

The valve connecting the purge gas line 20 to a source of purge gas is then opened. A purge gas then flows through the purge gas line 20 into the electroless plating waste in the internal container 14. The purge gas bubbles through the electroless plating waste and the stabilizing chemical, causing mixing and agitation thereof (Step 206). The purge gas is typically an inert gas, such as nitrogen, helium, or argon gas. Mechanical stirring and agitation or recirculation may be used instead of or in addition to agitation by purging of a gas through the electroless plating waste. Toward completion of the stabilization process, the purge gas serves to displace dissolved undesirable species such as hydrogen, which otherwise might evolve in waste lines or storage tanks downstream.

A gas or gases evolve from the electroless plating waste when the ability of the reducing agent to reduce the metal is decreased by any of the aforementioned processes. It may occur that gas evolves from the electroless plating waste without the above processes, but the above processes at least increase a rate at which these gases evolve from the electroless plating waste. The gases evolve into the enclosed volume 36, and exhaust through the exhaust opening 38 out of the enclosed volume 36. The gases typically include explosive gases such as hydrogen gas, and poisonous gases such as carbon monoxide and trimethylamine. Some of the gases, such as hydrogen gas, may be burned at an external stack.

Current is provided to the heating element 22, so that the heating element 22 heats the electroless plating waste (Step 208). (Infrared heating, exposure to hot gas, and other methods may be employed to heat the electroless plating waste.) The electroless plating waste is preferably heated to a temperature above 40° C. Heating of the electroless plating waste increases the rate of the respective process hereinbefore mentioned.

The electroless plating waste is held at an elevated temperature until completion of the process (Step 210). The temperature detector 30 detects the temperature of the electroless plating waste, and provides an operator with an output of the temperature. The operator can thus control the temperature of the electroless plating waste. The gas detector 26 detects the presence and concentration of the respective gases within the enclosed volume 36. An output is provided to an operator of the concentrations of the respective gases. The operator knows that the process is complete when the concentrations of the respective gases fall below certain predetermined limits. The pH detector 28 also detects the pH level of the electroless plating waste in any of the processes where the pH values are reduced. The pH values are monitored by the operator to determine completion of the process.

Once the process is completed, the operator opens a valve 300, which allows for flow of the electroless plating waste out of a base of the internal container 14 to drain (Step 212). The electroless plating waste flows through the filter 32, which filters particulate matter out, especially for the processes where the metal precipitates out of the electroless plating waste, whereafter the remaining electroless plating waste flows through the valve 300 to drain. Water at room temperature is added to the electroless plating waste before it flows to drain to cool the electroless plating waste. The electroless plating waste is preferably cooled to a temperature below 60° C.

EXAMPLE 1

The reducing agent may be decomposed utilizing an oxidation reaction or a hydrolysis reaction. For example, the cobalt electroless plating waste, containing cobalt, citric acid, $NH_4Cl$, TMAH, and DMAB, has a pH of between eight and ten. The pH may be decreased by adding diluted hydrogen chloride of between two and twenty percent by volume. The diluted hydrogen chloride reduces the pH to below two. Other acids instead of diluted hydrogen chloride which may be used include $H_2SO_4$, $HNO_3$, etc. Other reducing agents besides DMAB can also be neutralized by this process, including hypophosphite, formaldehyde, borohydride, etc. A hydrolysis reaction can be represented by the following chemical reaction:

$$(CH_3)_2HNBH_3 + 3H_2O + H^+ \rightarrow (CH_3)_2NH_2^+ + H_3BO_3 + 3H_2\uparrow$$

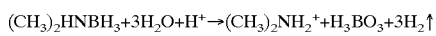

EXAMPLE 2

The ability for the reducing agent to reduce the metal can be decreased by changing the anodic potential of the reducing agent toward a cathodic potential of the metal, or by changing the cathodic potential of the metal toward the anodic potential of the reducing agent. For example, the copper electroless plating waste, including formaldehyde or glyoxylic acid as a reducing agent, can be admixed with $H_2SO_4$, HCl, $HNO_3$, etc., to reduce the pH of the electroless plating waste from between eleven and thirteen to between seven and eight, with a corresponding change in the anodic potential of the reducing agent toward a cathodic potential. Preferably, the pH decreases by at least 5. A typical reaction of this kind can be represented by the following chemical reaction:

$$H_2PO_2 + H_2O_2 + H^+ \rightarrow HPO_3 + H_2O + H_2\uparrow$$

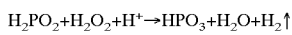

EXAMPLE 3

The ability of the reducing agent to reduce the metal can also be decreased by oxidizing the reducing agent. For example, the copper electroless plating waste, including copper, EDTA, TMAH, and glyoxylic acid, can be admixed with diluted hydrogen chloride of between two and twenty percent by volume, to reduce its pH value to below two, followed by the addition of $H_2O_2$. Other acids such as $H_2SO_4$ and $HNO_3$ can be used, as well as other oxidizing agents such as ammonium persulfate. A catalyst such as paladium in the form of $PdCl_2$, $PdSO_4$, etc., can be added at an elevated temperature of above 40° C. to verify that no carbon monoxide or flammable gases are being generated.

EXAMPLE 4

The ability of the reducing agent to reduce the metal can also be decreased by precipitating the metal out of the electroless plating waste by adding $PdCl_2$ or other catalysts to the waste, as well as decreasing the pH and temperature of the waste. A stabilizing solution such as a virgin make solution (VMS) containing copper sulfate, sulphuric acid, or HCl can be added to the copper electroless plating waste. Any precipitated particulate matter is filtered out of the electroless plating waste by the filter 32.

EXAMPLE 5

It is also possible to combine processes to decrease the ability of the reducing agent to reduce the metal. For example, diluted acids such as HCl, $H_2SO_4$, or $HNO_3$ may be used for hydrolysis of DMAB. A high-acid copper VMS, such as 180 g/1 $H_2SO_4$, 18 g/1 copper, and 50 parts per million chlorine, may then be added to further stabilize the electroless plating waste by further oxidation of the reducing agent with $H_2SO_4$ and poisoning the activity of the reducing agent with copper ions.

EXAMPLE 6

The ability of the reducing agent to reduce the metal may also be increased without adding any stabilizing chemicals to the electroless plating waste. A positive voltage can be applied to an anode to which the electroless plating waste is exposed. The reducing agent is oxidized by the anode. A cathode is also located in the waste to complete the circuit. Metal ions plate out over the cathode. To remove/dissolve the metal from the cathode, the potential over the anode and the cathode can be reversed so that the anode becomes the cathode and the cathode becomes the anode. The potential can be reversed at a frequency of between one second to a few minutes.

While certain exemplary embodiments have been described and shown in the accompanying drawings, it is to be understood that such embodiments are merely illustrative and not restrictive of the current invention, and that this invention is not restricted to the specific constructions and arrangements shown and described since modifications may occur to those ordinarily skilled in the art.

What is claimed:

1. A method of treating an electroless plating waste, comprising:
   containing the waste in a container, the waste including a metal and a reducing agent;
   decreasing an ability for the reducing agent to reduce the metal by adding an acid to the waste, resulting in a decrease in pH of the waste, decomposition of the reducing agent, and release of a gas from the waste in the container at a rate which is higher than without the decrease in the ability for the reducing agent to reduce the metal, the gas being contained in an enclosed volume;
   exhausting the gas from the enclosed volume; and
   draining the waste from the container.
2. The method of claim 1 wherein the pH decreases by at least 5.
3. The method of claim 1, further comprising:
   detecting a pH of the waste, the waste being drained after the pH falls below a predetermined limit.
4. The method of claim 1 wherein the pH is reduced by decomposing the reducing agent by at least one of:
   (i) an oxidation reaction, and
   (ii) a hydrolysis reaction.
5. The method of claim 1 wherein the metal is cobalt, the reducing agent is at least one of DMAB, hypophosphite, formaldehyde, and borohydride, and the ability for the reducing agent to reduce the metal is reduced by decomposing the reducing agent, utilizing at least one of a hydrolysis reaction and an oxidation reaction.
6. The method of claim 1, further comprising: mixing and agitating the waste in the container.
7. The method of claim 6 wherein the waste is mixed and agitated by at least one of purging a gas therethrough, mechanical mixing and agitation, and recirculation.
8. The method of claim 6, further comprising: heating the waste in the container.
9. The method of claim 1, further comprising: heating the waste in the container.
10. The method of claim 9 wherein the waste is heated to at least 40° C.
11. The method of claim 1 wherein the reducing agent is at least one of:
    (i) DMAB;
    (ii) hypophosphite;
    (iii) borohydride; and
    (iv) formaldehyde.
12. The method of claim 1 wherein the metal is cobalt.
13. The method of claim 1 wherein the gas is hydrogen.
14. A method of treating an electroless plating waste, comprising:
    containing the waste in a container, the waste including a metal and a reducing agent which tends to reduce the waste;
    adding at least one stabilizing chemical to the waste in the container, the at least one stabilizing chemical being selected to (i) decrease the ability of the reducing agent to reduce the metal, and (ii) cause release of a gas from the waste at a rate which is higher than without the at least one stabilizing chemical, the gas being contained in an enclosed volume above a surface of the waste in the container;
    agitating the waste in the container;
    exhausting the gas from the enclosed volume;
    detecting the concentration of the gas in the enclosed volume; and
    draining the waste from the container, once the concentration of the gas falls below a predetermined limit.
15. The method of claim 14 wherein the ability for the reducing agent to reduce the metal is decreased by adding a stabilizing chemical to the waste which decreases a pH of the waste.
16. The method of claim 14 wherein the ability for the reducing agent to reduce the metal is decreased by adding a stabilizing chemical to the waste which changes a potential of the reducing agent from anodic toward cathodic.
17. The method of claim 14 wherein the ability of the reducing agent to reduce the metal is decreased by adding a stabilizing chemical to the waste which causes precipitation of the metal into a base of the container.
18. The method of claim 14 wherein the method is at least semi-automatic, depending on at least one of pH, temperature, measured gas concentration, and time.

* * * * *